(12) United States Patent
Gupta

(10) Patent No.: US 10,411,845 B2
(45) Date of Patent: *Sep. 10, 2019

(54) INTERNET PROTOCOL INTERFACE SELECTION FOR ROUTING DATA TRAFFIC

(71) Applicant: Intel IP Corporation, Santa Clara, CA (US)

(72) Inventor: Vivek Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,650

(22) Filed: Jan. 29, 2018

(65) Prior Publication Data

US 2018/0152270 A1 May 31, 2018

Related U.S. Application Data

(63) Continuation of application No. 14/227,829, filed on Mar. 27, 2014, now Pat. No. 9,912,449.

(Continued)

(51) Int. Cl.
*H04L 5/00* (2006.01)
*H04W 48/16* (2009.01)
(Continued)

(52) U.S. Cl.
CPC ........... *H04L 5/0007* (2013.01); *H04B 15/00* (2013.01); *H04J 11/00* (2013.01); *H04L 5/0005* (2013.01);
(Continued)

(58) Field of Classification Search
CPC ... H04W 28/08; H04W 40/246; H04W 88/02; H04W 88/04
See application file for complete search history.

(56) References Cited

U.S. PATENT DOCUMENTS 8,185,152 B1   5/2012  Goldner
2010/0272013 A1  10/2010  Horn et al.
(Continued)

FOREIGN PATENT DOCUMENTS

TW   201127130 A1   8/2011
TW   201246875 A1  11/2012
(Continued)

OTHER PUBLICATIONS

3GPP TR 23.853 V0.4.0 3$^{rd}$ Generation Partnership Project; Technical Specification Group Services and System Aspects; Operator Policies for IP Interface Selection (OPIIS); Jun. 6, 2012; Sophia-Antipolis Cedex, France; (Release 12).
(Continued)

*Primary Examiner* — Derrick W Ferris
*Assistant Examiner* — Farhad Ali
(74) *Attorney, Agent, or Firm* — Thorpe North & Western

(57) ABSTRACT

A technology for a user equipment (UE) that is operable to select an internet protocol (IP) interface in a communications network is disclosed. Local policy information and access network selection information can be received from an Access Network Discovery and Selection Function (ANDSF) operating on a server in an evolved packet core (EPC). At least one IP interface on which to route an IP flow using inter access point name routing policies (IARP) can be determined prior to implementing other routing policies. The IP flow from the UE on at least one IP interface selected can be routed using the IARP.

22 Claims, 16 Drawing Sheets

Related U.S. Application Data

(60) Provisional application No. 61/843,826, filed on Jul. 8, 2013.

(51) Int. Cl.
*H04W 28/04* (2009.01)
*H04W 72/08* (2009.01)
*H04W 56/00* (2009.01)
*H04W 84/18* (2009.01)
*H04W 28/08* (2009.01)
*H04W 40/24* (2009.01)
*H04W 80/04* (2009.01)
*H04W 88/02* (2009.01)
*H04W 8/00* (2009.01)
*H04B 15/00* (2006.01)
*H04J 11/00* (2006.01)
*H04W 72/04* (2009.01)
*H04W 72/12* (2009.01)
*H04W 84/04* (2009.01)

(52) U.S. Cl.
CPC ............ *H04L 5/005* (2013.01); *H04L 5/0048* (2013.01); *H04L 5/0073* (2013.01); *H04W 8/005* (2013.01); *H04W 28/04* (2013.01); *H04W 28/08* (2013.01); *H04W 40/246* (2013.01); *H04W 48/16* (2013.01); *H04W 56/002* (2013.01); *H04W 72/044* (2013.01); *H04W 72/0413* (2013.01); *H04W 72/082* (2013.01); *H04W 72/1215* (2013.01); *H04W 80/04* (2013.01); *H04W 84/18* (2013.01); *H04W 88/02* (2013.01); *H04W 84/042* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01)

(56) References Cited

U.S. PATENT DOCUMENTS

2011/0103266 A1   5/2011   Andreasen et al.
2011/0153792 A1   6/2011   Bachmann
2014/0022898 A1   1/2014   Kim et al.

FOREIGN PATENT DOCUMENTS

TW         201246879 A1   11/2012
WO    WO 2012/149954 A1   11/2012
WO    WO 2013/022219 A1    2/2013

OTHER PUBLICATIONS

3GPP TS 24.302 V11.2.0 $3^{rd}$ Generation Partnership Project; Technical Specification Group Core Network and Terminals; Access to the 3GPP Evolved Packet Core (EPC) via non-3GPP access networks; Mar. 13, 2012; Stage 3; Sophia-Antipolis Cedex, France; (Release 11).

3GPP TS 24.312 V10.3.0 $3^{rd}$ Generation Partnership Project; Technical Specification Group Core Network and Terminals; Access Network Discovery and Selection Function (ANDSF) Management Object (MO); Jun. 14, 2011; Sophia-Antipolis Cedex, France; (Release 10).

3GPP TSG-RAN WG1 Meeting #76—R1-140411; Intel-On support of TDD-FDD Carrier Aggregation; Feb. 10-14, 2014; Prague, Czech Republic; Agenda item: 7.2.3.1.

3GPP TSG RAN WG1 Meeting #75-R1-136009; LG Electronics-Offline discussion on self-scheduling for TDD-FDD CA; Nov. 11-15, 2013; San Francisco, USA; Agenda 6.2.3.1.

3GPP TS 36.211 V11.5.0 (Dec. 2013) Evolved Universal Terrestrial Radio Access (E-UTRA); Physical channels and modulation (Release 11).

3GPP TS 36.213 V11.1.0 (Dec. 2012) Evolved Universal Terrestrial Radio Access (E-UTRA); Physical layer procedures (Release 11).

1400

Receive, from an Access Network Discovery and Selection Function (ANDSF) operating on a server in an evolved packet core (EPC), local policy information and access network selection information — 1410

Determine at least one IP interface on which to route an IP flow using inter access point name routing policies (IARP) prior to implementing other routing policies — 1420

Route the IP flow from the UE on the at least one IP interface selected using the IARP — 1430

FIG. 14

INTERNET PROTOCOL INTERFACE SELECTION FOR ROUTING DATA TRAFFIC

RELATED APPLICATIONS

This application is a continuation of U.S. patent application Ser. No. 14/227,829 filed Mar. 27, 2014 which claims the benefit of and hereby incorporates by reference U.S. Provisional Patent Application Ser. No. 61/843,826, filed Jul. 8, 2013.

BACKGROUND

A local Internet protocol (IP) access can provide for communication between wireless transmit/receive units (WTRUs) belonging to the same local network, such as a residential network or an enterprise network. A local IP access-enabled WTRU that is connected to a home evolved Node B (HeNB) that is part of a local network can access other local IP access-enabled WTRUs that are attached to a HeNB that is part of the same local network.

Selected IP traffic offload (SIPTO) can provide for offloading of selected traffic, such as internet traffic, to an IP network close to a point of attachment of a WTRU to an access network. Operator policies for IP interface selection (OPIIS) have been established for selecting an IP interface in a WTRU for routing IP flows among different interfaces in both third generation partnership (3GPP) and non-3GPP accesses. OPIIS policies can be implemented by an access network discovery and selection function (ANDSF), which may assist a WTRU to discover non-3GPP access networks and govern the connection of 3GPP and non-3GPP networks. The OPIIS can examine a system architecture and provide operator policies to a UE using the ANDSF architecture. The UE can determine how to route an IP flow by evaluating both Inter Access Point Name (APN) Routing Policies (IARP) and Inter-System Routing Policies (ISRP) Routing Policies.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 14 depicts the functionality of another computer circuitry with a UE operable to select an IP interface in a communications network in accordance with an example;

Figure 1:
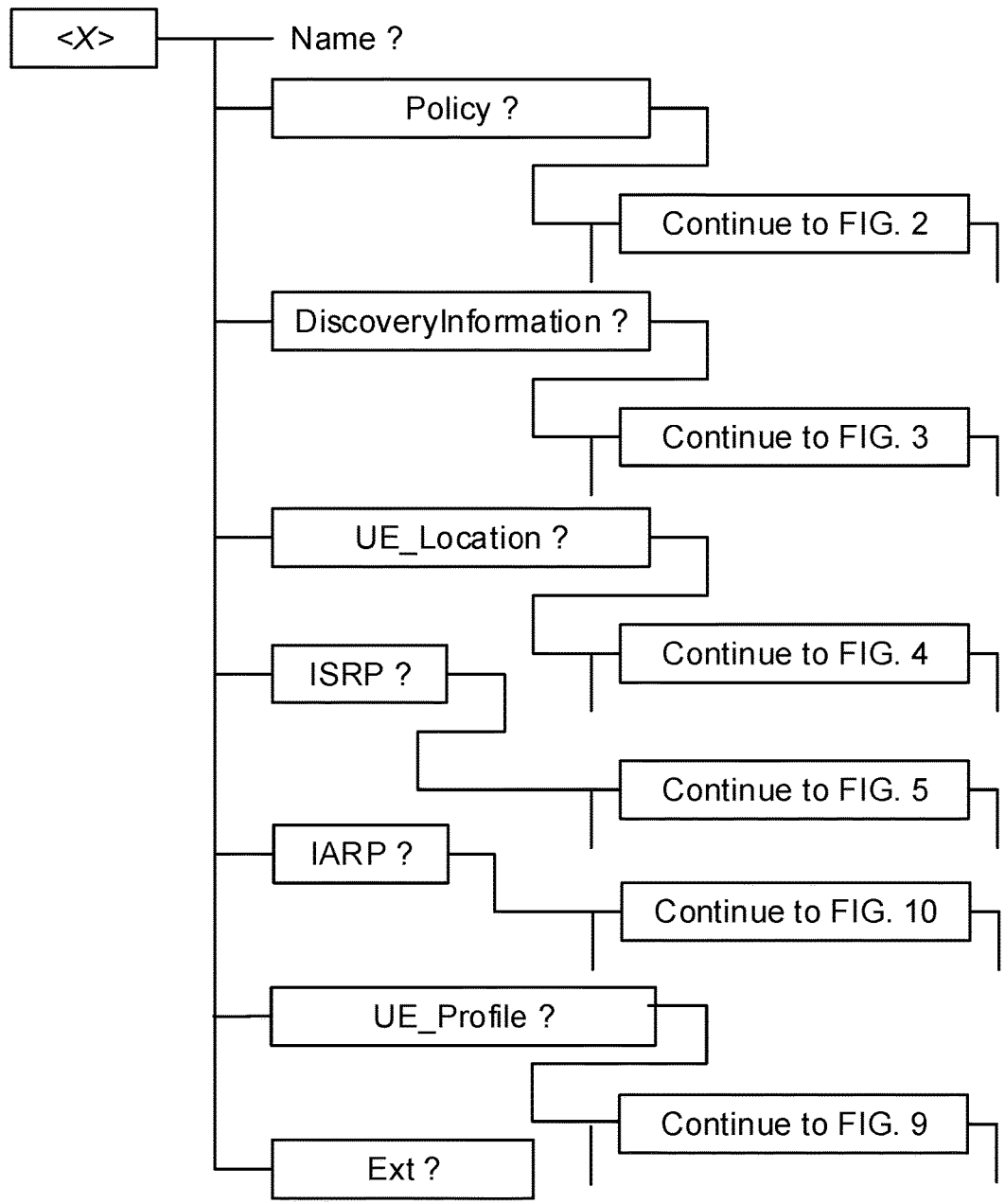
FIG. 1 shows an access network discovery and selection function (ANDSF) management object (MO) can be used to manage inter-system routing policy (ISRP) and inter-access point name routing policy (IARP) in accordance with an example.

Reference will now be made to the exemplary embodiments illustrated, and specific language will be used herein to describe the same. It will nevertheless be understood that no limitation of the scope of the invention is thereby intended. [Not sure if we need figures for all these different nodes of ANDSF]

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

The operator policies for internet protocol (IP) interface selection (OPIIS) can specify operator policies for selecting an IP interface. Traditionally, an operator policies rule for a user equipment (UE) that supports inter-access point name (APN) routing policies (IARP) and that is not capable of routing IP traffic flows simultaneously over multiple radio access interfaces will evaluate the IARP and determine if any of the policies match an IP flow. The highest priority IARP that matches the IP flow is selected as the packet data networks (PDN) connection, e.g. the one connection associated with a preferred APN in the policy, that is to be used for routing the IP flow. Traditionally, the operator policies rule provides that a UE capable of routing IP traffic simultaneously over multiple radio access interfaces uses an inter-system routing policies (ISRP) and the IARP. The UE determines how to route an IP flow by evaluating both the ISRP and the IARP.

When the UE uses the traditional routing rule for evaluating IARP and ISRP policies, the routing rules conflict. Traditionally, the UE determines how to route an IP flow by evaluating both the ISRP and the IARP. A filter rule used for non-seamless wireless local area network (WLAN) offload (NSWO) has a relative priority with respect to a filter rule used for IARP. When the UE follows the traditional rule and the data traffic or IP flow matches both the IARP rules and NSWO rules, there is a rule conflict. The conflict in routing rules between evaluation of IARP and ISRP is due to the NSWO case.

In one embodiment, to resolve the conflict between the IARP rules and ISRP rules, a priority rule can be set where the IARP can be evaluated before the ISRP is evaluated. For example, to determine the IP interface to route the IP flow, the UE can be configured to first evaluate the IARP and then evaluate the ISRP. In one embodiment, the IARP can indicate the data traffic or IP flow to be routed across different PDN connections and which traffic should be non-seamlessly offloaded to a WLAN. When the UE evaluates the IARP first to determine the IP interface, an output rule can be an APN_x parameter. When the UE later evaluates the ISRP to determine the IP interface after the IARP, the APN_x parameter can be an additional input.

In another embodiment, to resolve the conflict between the IARP rules and ISRP rules, the IARP can include inter-APN rules and NSWO policies. When the IARP includes the NSWO policies, the UE can determine the priority level of the NSWO in relation to the ISRP. For example, when the IARP includes the NSWO, the UE can evaluate the ISRP after the IARP with the APN_x parameter as an additional input. The priority level can be set so that the UE can determine that the ISRP cannot be configured so that NSWO is selected as a higher priority with respect to one APN, such as an APN_x, but a lower priority with respect to another APN, such as an APN_y. One advantage of the IARP including the NSWO and the inter-APN rules can be to provide the access network discovery and selection function (ANDSF) with flexibility to define priorities for both the IARP and NSWO.

FIG. 1 shows nodes and leaf objects under an ANDSF management object (MO). FIG. 1 further shows the ANDSF MO can be used to manage the Inter-System Routing Policy (ISRP) and the Inter-APN Routing Policy (IARP). In one embodiment, the ANDSF MO can access policy information, discovery information, UE location information, and UE profile information stored at a UE. In one example, an NSWO branch can be added to the IARP policy and the ANDSF MO can be modified based on the adding of the NSWO branch to the IARP policy.

Figure 5:
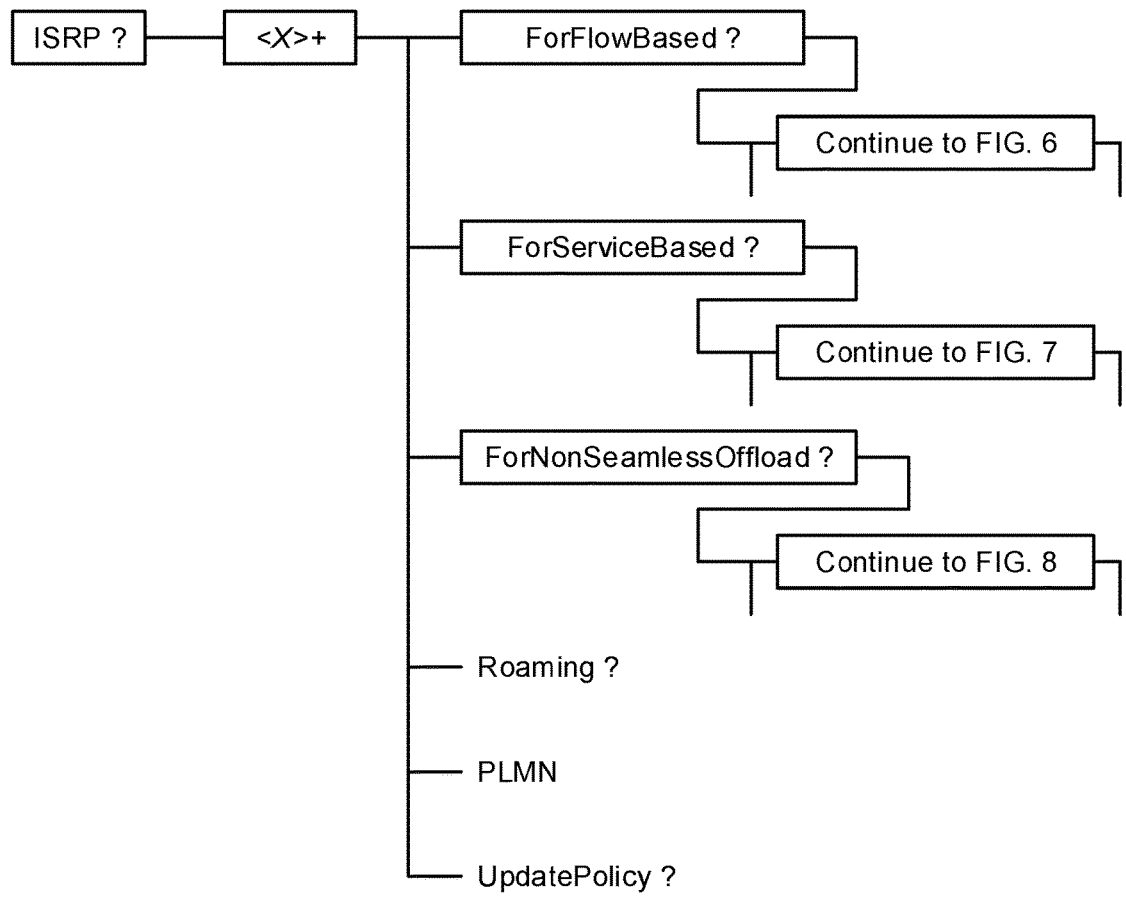
FIG. 5 shows a list of ISRP policies for routing IP traffic in an ANDSF MO in accordance with an example.
Figure 10:
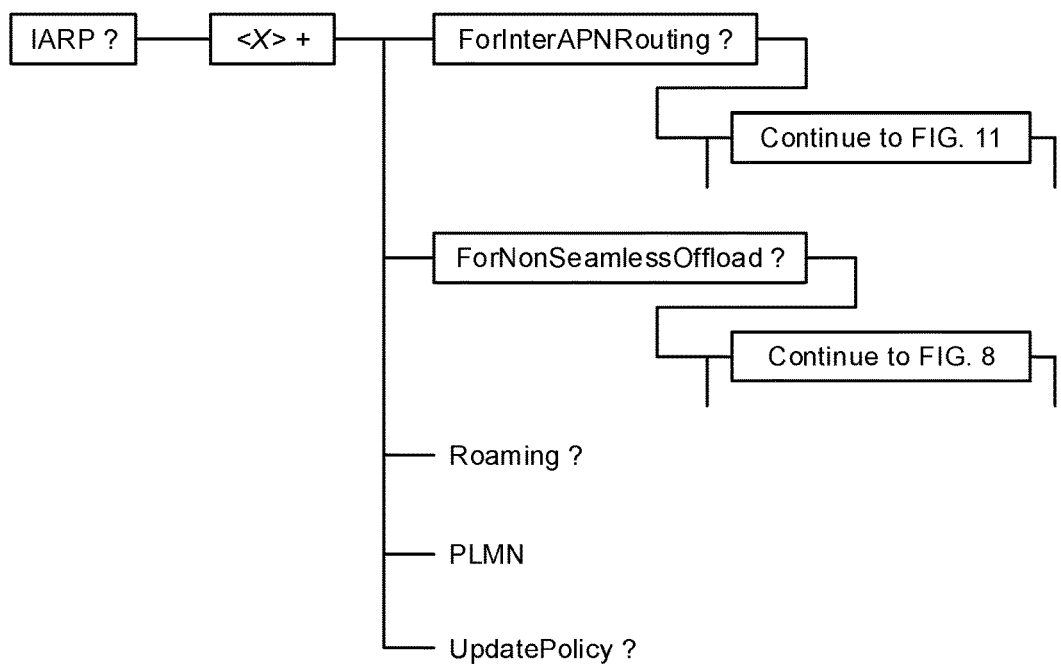
FIG. 10 shows a list of IARP policies for routing IP traffic in an ANDSF MO in accordance with an example.

In one embodiment, one or more of the nodes or leaves of the ANDSF MO can used by the UE to determine if a routing policy rule is valid. For example, the UE can first use the IARP node or leaf under the ANDSF MO to determine if a routing policy rule is valid. In one embodiment, the UE can determine that the IARP routing policy is valid and use the IARP nodes and leaf objects, such as shown in FIG. 10, to route an IP flow. In one embodiment, the UE can determine that the IARP routing policy is valid when selected conditions occur under routing criteria of the ANDSF MO, such as the interAPNRouting criteria shown in FIG. 8 and the ForNonSeamlessOffload criteria shown in FIG. 11. In another embodiment, the UE can determine that the IARP is not valid. When the UE determines that the IARP is not valid, then the UE can determine that the ISRP is valid and can use the ISRP nodes and leaf objects, such as shown in FIG. 5, to route an IP flow.

Figure 2:
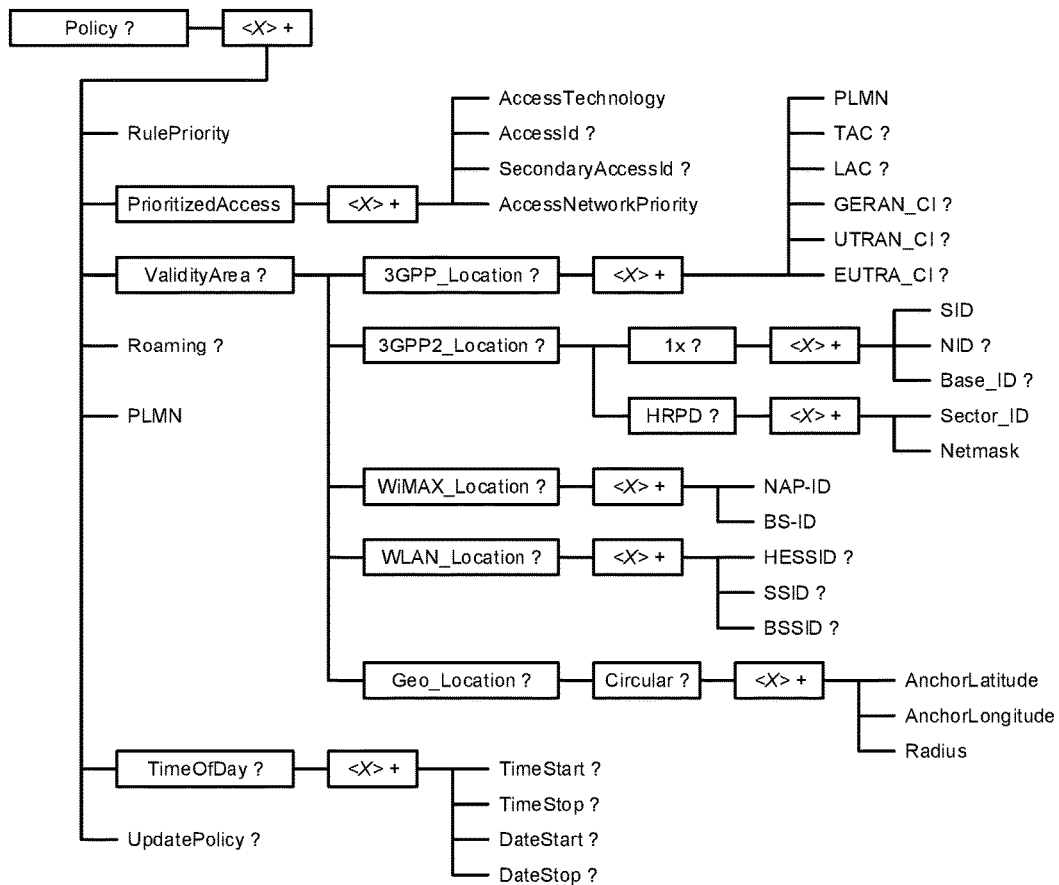
FIG. 2 shows a list of policies for routing internet protocol (IP) traffic in an ANDSF MO including a policy list in accordance with an example.

FIG. 2 shows a list of policies for routing IP traffic in an ANDSF MO. FIG. 2 further shows that the ANDSF MO from FIG. 1 can include a policy list. In one embodiment, the policy list can include: a rule priority; prioritized access information; validity area information; roaming information, public land mobile network (PLMN) information, time of day information, and update policy information.

Figure 3:
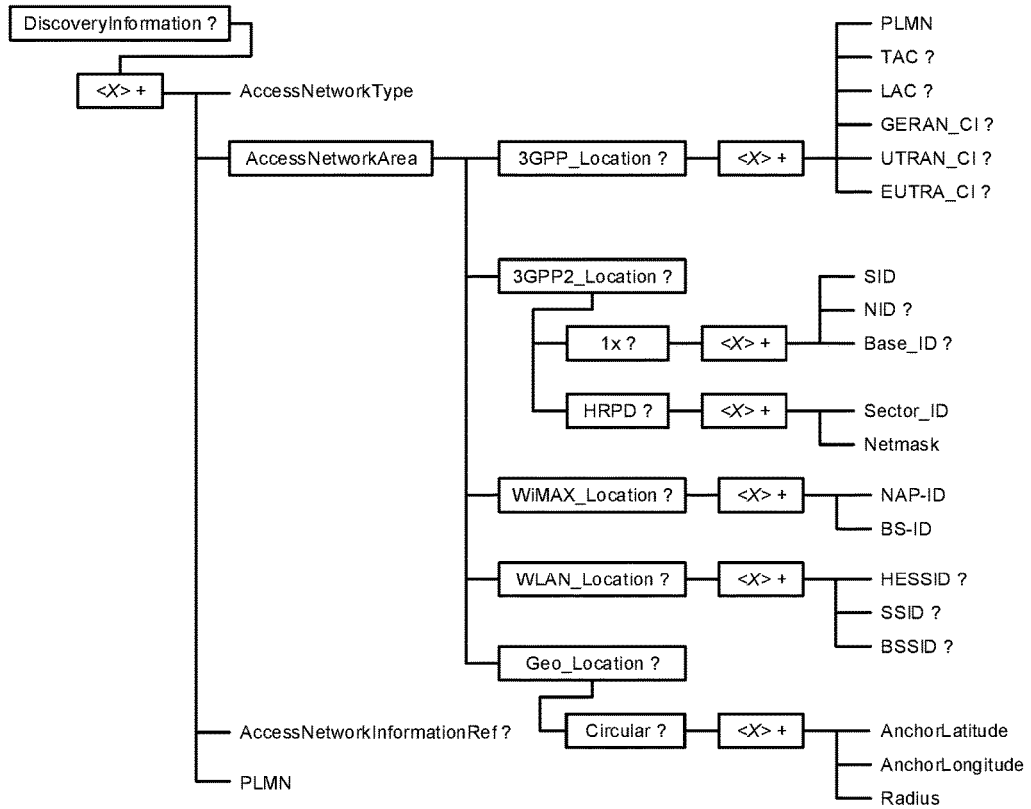
FIG. 3 shows a list of discovery information for routing IP traffic in an ANDSF MO in accordance with an example.

FIG. 3 shows a list of discovery information for routing IP traffic in an ANDSF MO. FIG. 3 further shows that the ANDSF MO from FIG. 1 can include a list of discovery information. In one embodiment, the list of discovery information can include: access network type information, access network area information, access network information references, and PLMN information.

Figure 4:
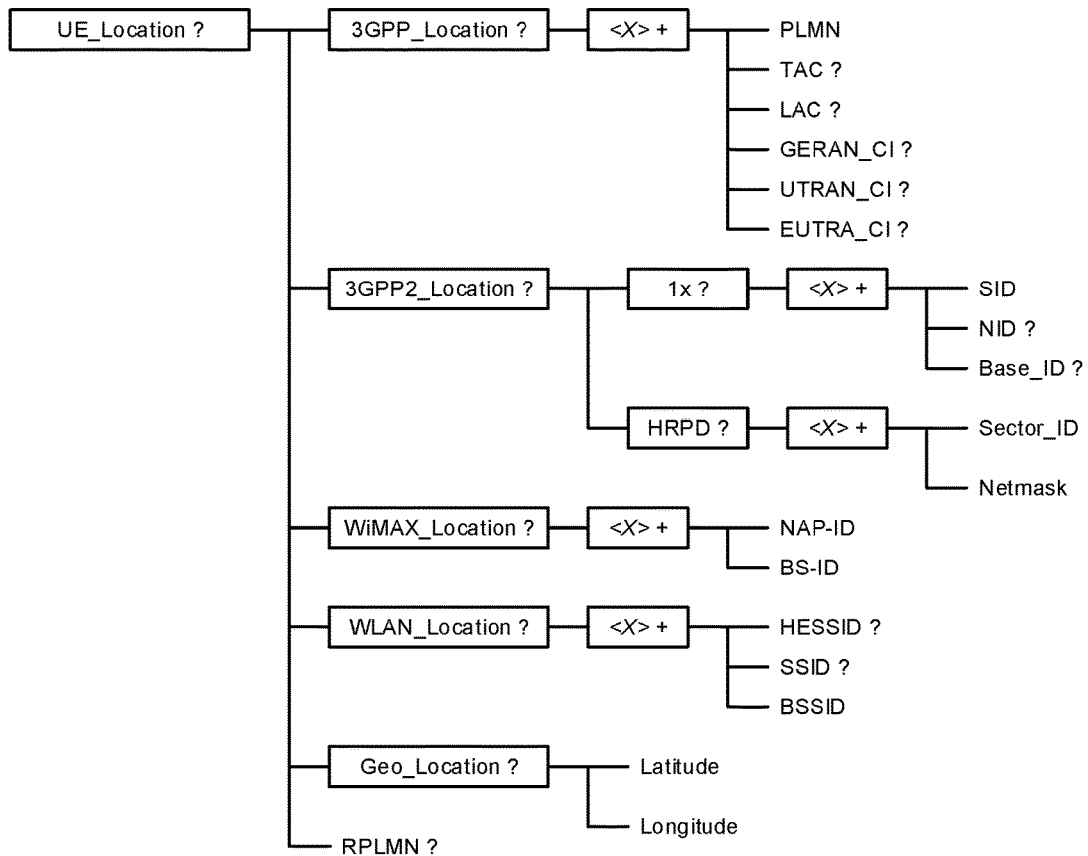
FIG. 4 shows of a list of user equipment (UE) location information for routing IP traffic in an ANDSF MO in accordance with an example.

FIG. 4 shows a list of UE location information for routing IP traffic in an ANDSF MO. FIG. 4 further shows that the ANDSF MO from FIG. 1 can include the list of UE location information. In one embodiment, the UE location information can include: third generation partnership project (3GPP) location information, worldwide interoperability for microwave access (WiMAX) location information, WLAN location information, geographic (Geo) location information, and registered PLMN (RPLMN) information. In one embodiment, the location information may be for 3GPP Long Term Evolution (LTE) Rel. 8, 9, 10, 11, or 12 networks and/or Institute of Electrical and Electronics Engineers (IEEE) 802.16p, 802.16n, 802.16m-2011, 802.16h-2010, 802.16j-2009, 802.16-2009.

Figure 6:
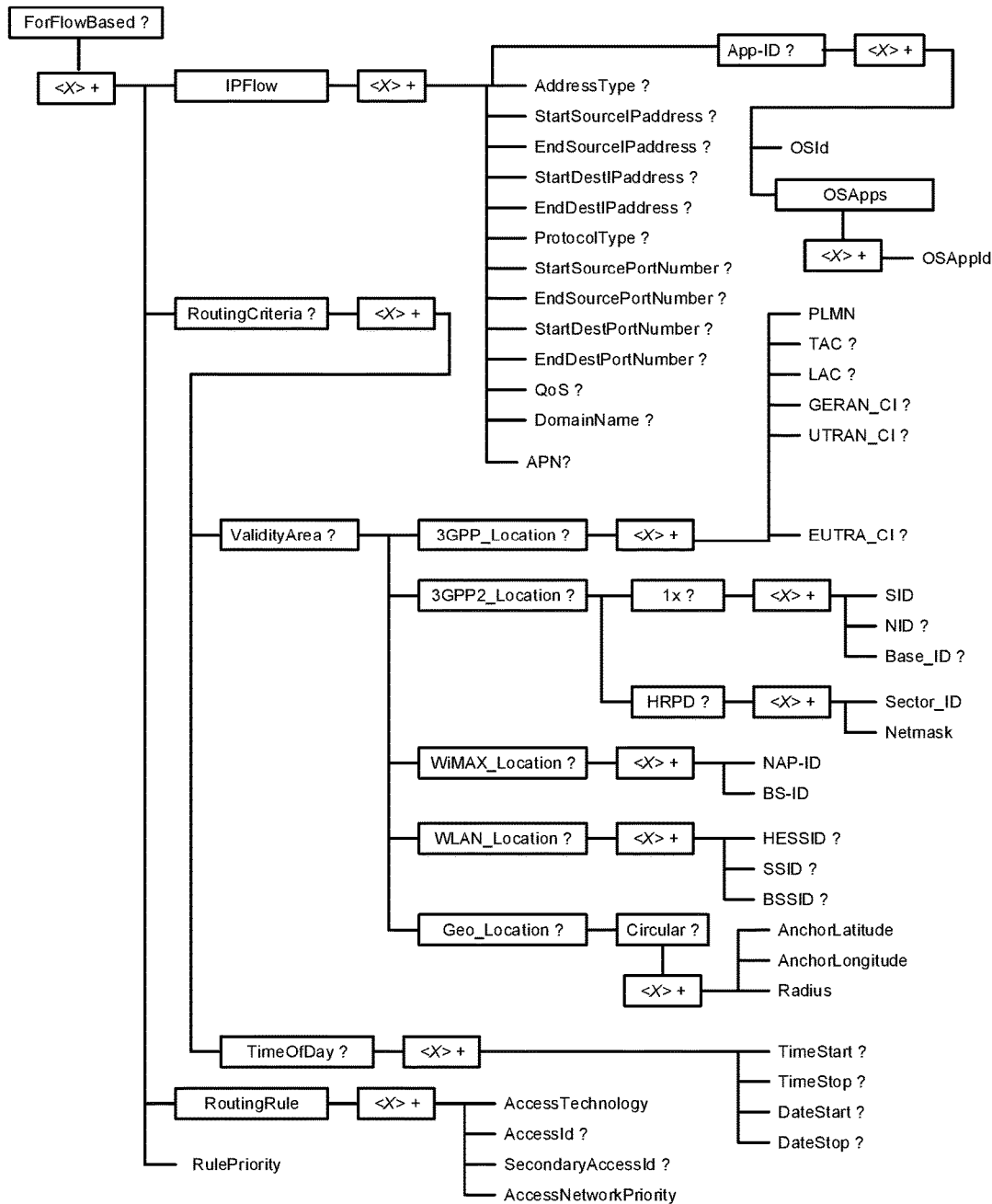
FIG. 6 shows a list of flow based information for an ISRP used for routing IP traffic in an ANDSF MO in accordance with an example.
Figure 7:
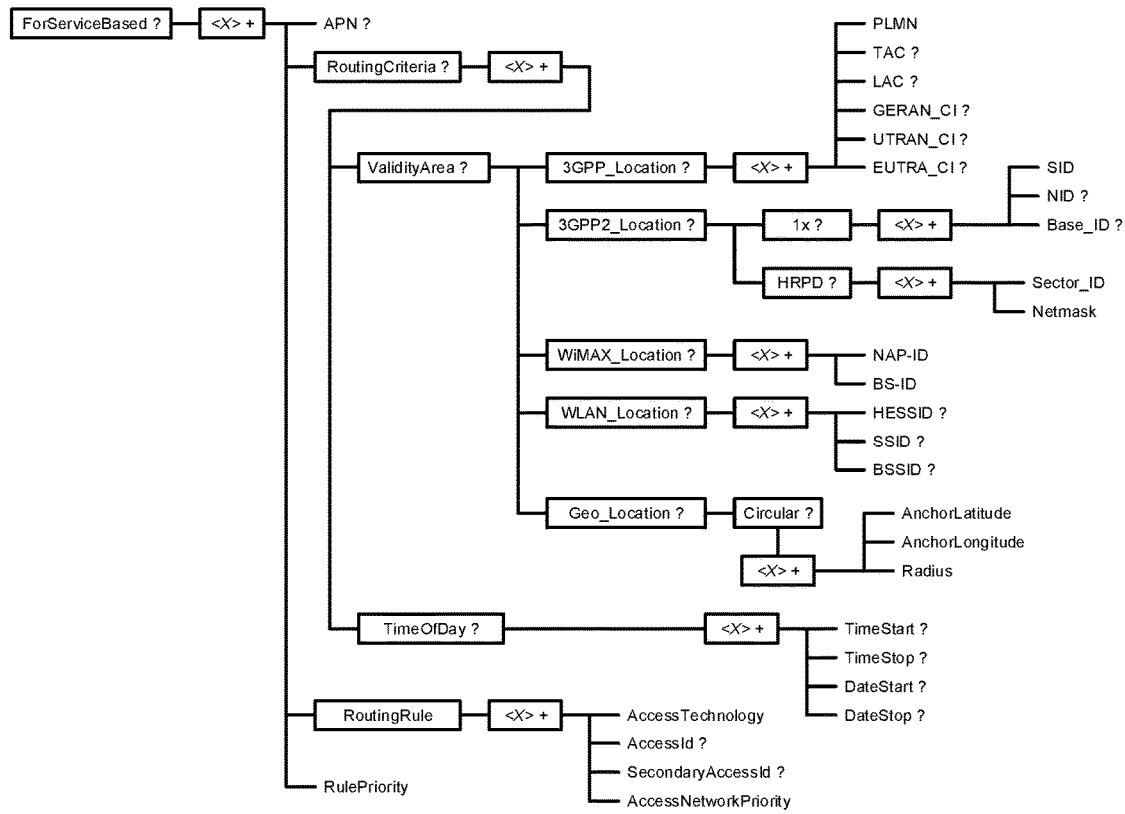
FIG. 7 shows a list of service based information for an ISRP used for routing IP traffic in an ANDSF MO in accordance with an example.
Figure 8:
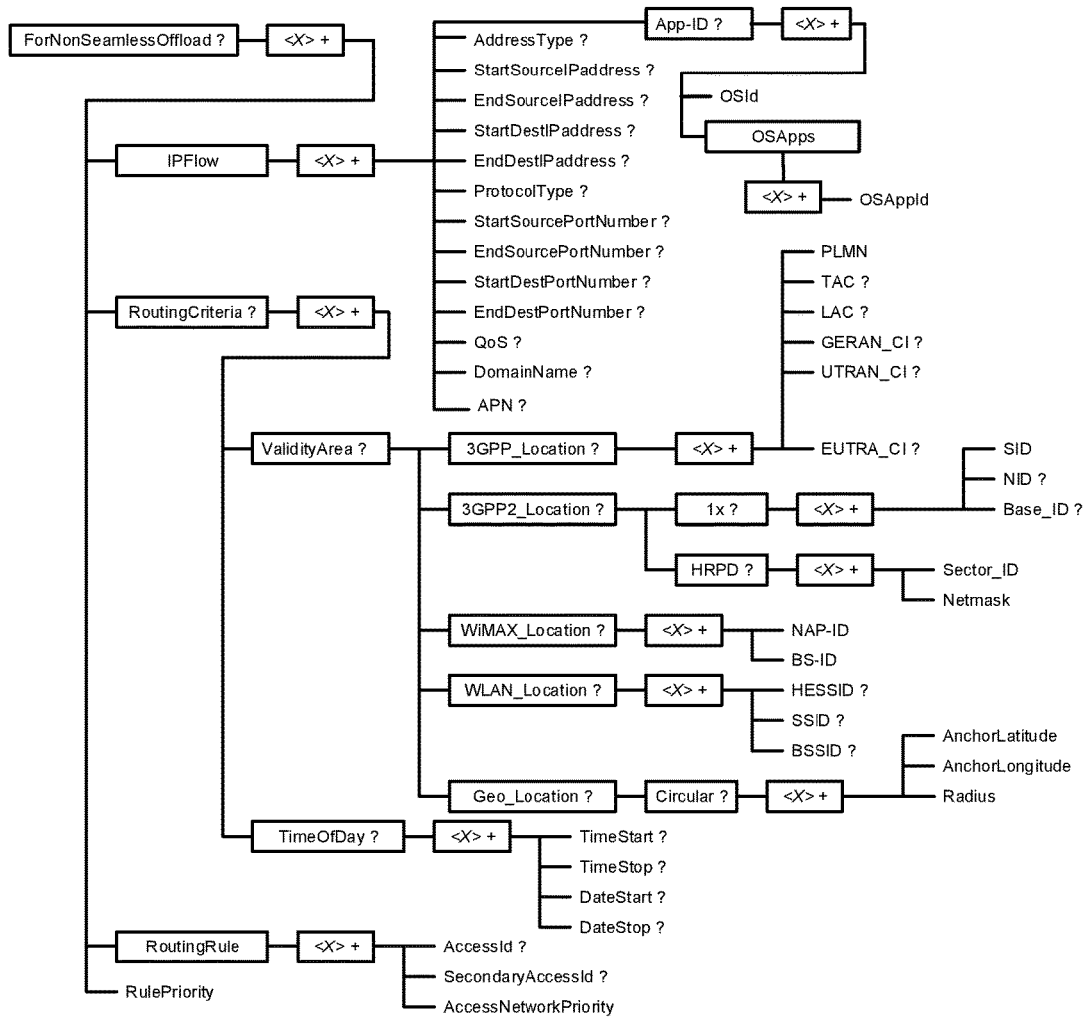
FIG. 8 shows a list of non-seamless wireless local area network (WLAN) offload (NSWO) policies for routing IP traffic in an ANDSF MO. in accordance with an example.

FIG. 5 shows a list of ISRP policies for routing IP traffic in an ANDSF MO. FIG. 5 further shows that the ANDSF MO from FIG. 1 can include the list of ISRP policies. In one embodiment, the list of ISRP policies can include: flow based information, as shown in FIG. 6; service based information, as shown in FIG. 7; a list of NSWO policies, as shown in FIG. 8; roaming information; PLMN information; and update policy information.

FIG. 6 shows a list of flow based information for an ISRP used for routing IP traffic in an ANDSF MO. FIG. 6 further shows that the ISRP from FIG. 5 can include a list of flow based information. In one embodiment, the list of flow based information can include: IP flow information, routing criteria information, routing rule information, and rule priority information.

FIG. 7 shows a list of service based information for an ISRP used for routing IP traffic in an ANDSF MO. FIG. 7 further shows that the ISRP from FIG. 5 can include the list of service based information. In one embodiment, the list of service based information can include: routing criteria information, routing rule information, and rule priority information.

FIG. 8 shows a list of NSWO policies for routing IP traffic in an ANDSF MO. FIG. 8 further shows that the ISRP from FIG. 5 can include the list of NSWO policies. In one embodiment, the flow based information can include: IP flow information, routing criteria information, routing rule information, and rule priority information.

Figure 9:
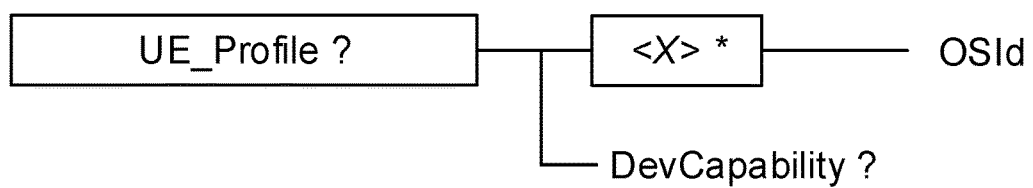
FIG. 9 shows a list of UE profile information for routing IP traffic in an ANDSF MO in accordance with an example.

FIG. 9 shows a list of UE profile information for routing IP traffic in an ANDSF MO. FIG. 9 further shows that the ANDSF MO from FIG. 1 can include a list of UE profile information. In one embodiment, the list of UE profile information can include device capability (DevCapability) information.

Figure 11:
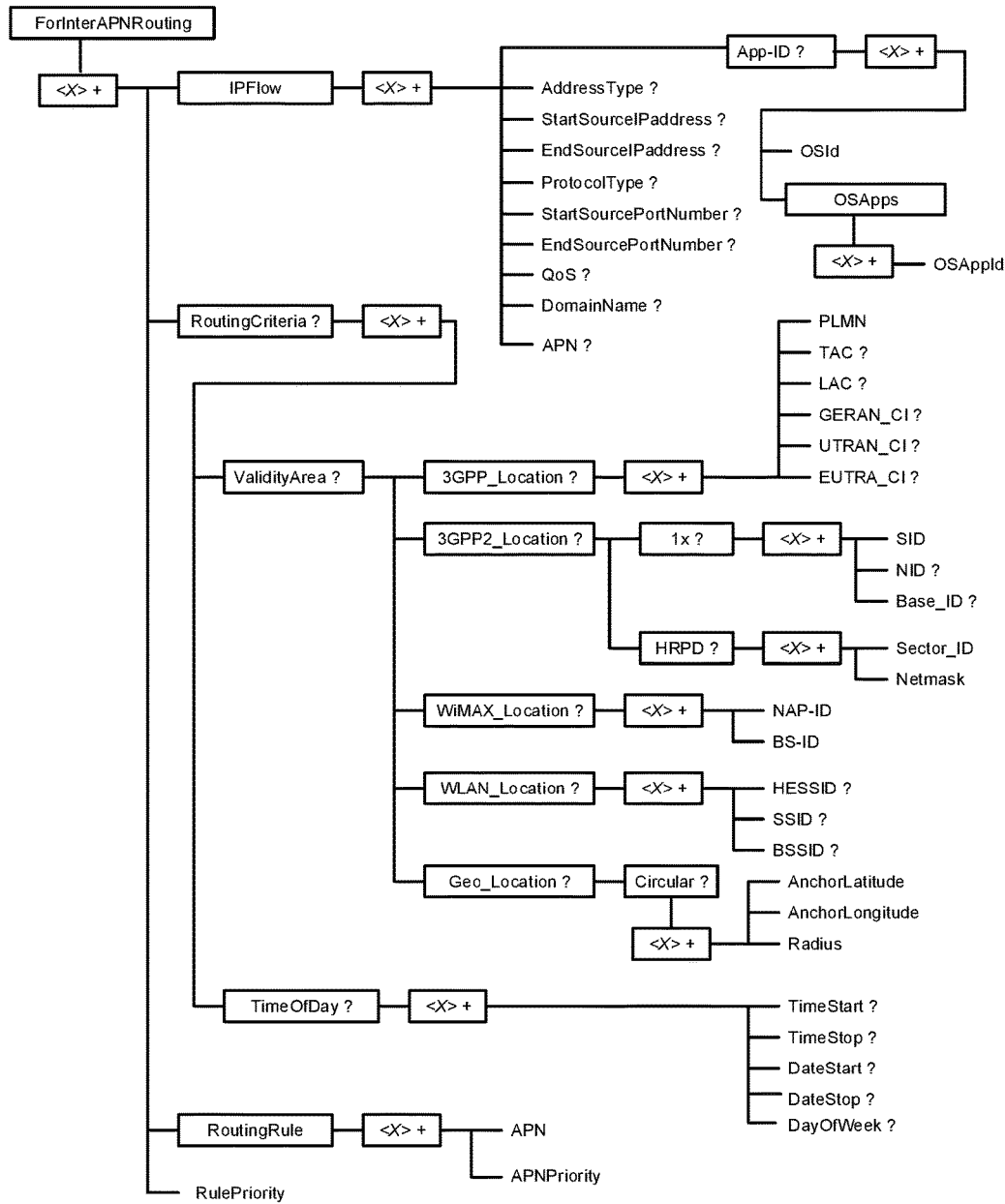
FIG. 11 shows a list of inter-APN routing rules with APN routing rules and APN priority routing rules in accordance with an example.

FIG. 10 shows a list of IARP policies for routing IP traffic in an ANDSF MO. FIG. 10 further shows that the list of IARP from FIG. 1 can include inter-APN rules and NSWO policies. In one embodiment, the list of IARP policies can include: inter-APN information, as shown in FIG. 11; NSWO, as shown in FIG. 8; roaming information, PLMN information, and update policy information.

FIG. 11 shows a list of inter-APN routing rules with APN routing rules and APN priority routing rules. FIG. 11 further shows that the IARP from FIG. 10 can include a list of inter-APN routing rules. In one embodiment, the APN routing rules can include NSWO routing policies. In one embodiment, the list of inter-APN routing rules can include: IP flow information, routing criteria information, routing rule information, and rule priority information.

In FIG. 11, for the Inter-APN Routing a special value can be assigned for the APN node for an NSWO case. The special value can be used to set a priority level of the NSWO to enable the NSWO to be evaluated along with the IARPs. In one embodiment, the special values are defined in section 5.9.28 of 3GPP Technical Specification (TS) version 12.4.0 as <X>/IARP/<X>/ForInterAPNRouting/<X>/RoutingRule/<X>/APN.

In FIG. 11, the APN leaf can indicate that the APN is valid for a particular flow distribution rule. In one embodiment, a special value is assigned to the APN for the NSWO case. In another embodiment, the special value can include information such as an occurrence being one, a format being chr, access types being get, replace, and values being APN. In one embodiment, the NSWO APN can be coded as an APN with # as a single label of the NSWO APN, i.e. a length octet with value one, followed by an American standard code for information interchange (ASCII) code for the #.

Figure 12:
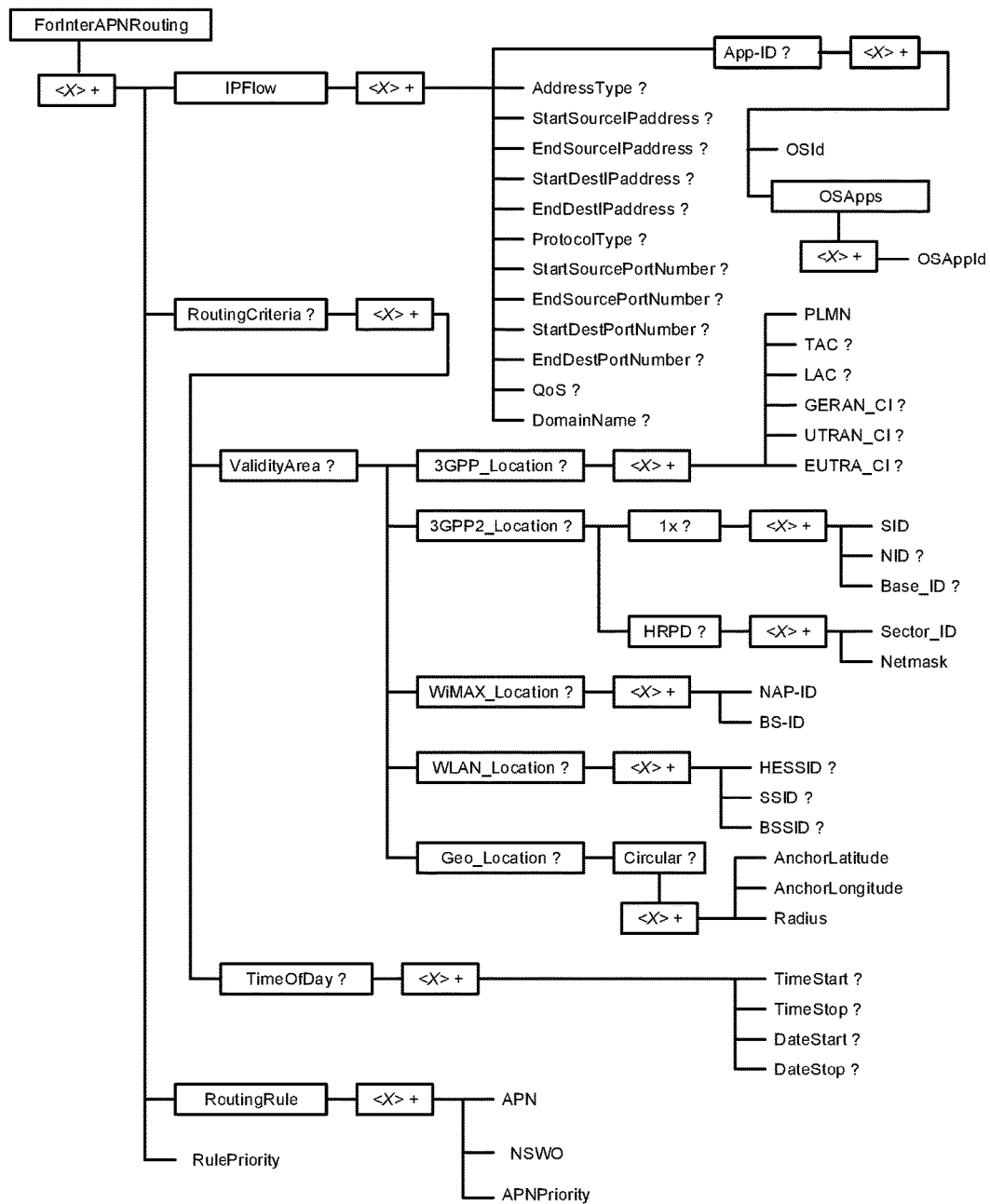
FIG. 12 shows a list of inter-APN routing rules with APN routing rules and APN priority routing rules with a separate NSWO leaf node in accordance with an example.

FIG. 12 shows a list of inter-APN routing rules with routing rules that include APN routing rules and APN priority routing rules with a separate NSWO leaf node. The separate NSWO leaf node can indicate the priority for a NSWO case. With the separate NSWO leaf node, a priority for the NSWO can be evaluated along with the priority for the IARPs. FIG. 12 is the same as FIG. 11 in other regards.

Traditional routing rules provide rules for roaming in ISRP and inter-system mobility policy (ISMP) scenarios. However, when the UE follows the traditional routing rules for evaluating IARP and ISRP policies, the traditional routing rules do not address an IARP roaming scenario. The rules for roaming in ISRP and ISMP fail to provide rules for a home-routed versus local breakout scenario for IARP, such as when a home public land mobile network (H-PLMN) determines when to allow a local break-out and when not allow a local break-out. Traditionally, the rules for roaming in ISRP and ISMP also fail to prioritize an IARP provided by a home ANDSF (H-ANDSF) for selected scenarios. The rules for roaming in ISRP and ISMP also fail to provide rules for an interaction between an IARP in an H-ANDSF and an ISRP or ISMP provided by a visited ANDSF (V-ANDSF).

Additionally, traditionally, in roaming scenarios the priorities of IARPs need to be evaluated based on policies from a home operator and the ISRP priorities need to be evaluated based on policies from a visited operator. These priority values are not consistent across different operators and can cause the UE to make inconsistent or make different decisions for different cases.

In one embodiment, to address routing rules for an IARP roaming scenario, the UE can use APNs from a home operator of the H-ANDSF. The home operator can configure the UE with APNs based on a user subscription. In one embodiment, the APNs configured by the home operator can be transparent to a visited operator of the V-ANDSF. For example, the visited operator may be unaware of the actual APNs configured in the UE for IARP roaming scenarios. In one embodiment, when the UE receives routing policies, such as IARP or ISRP, from a V-ANDSF the UE can disregard the received routing policies.

In another embodiment, to address the routing rules for IARP roaming scenario, the UE can be preconfigured by the home operator for specific APNs that are used when the UE is connected to one or more preferred visited roaming partners. One advantage of preconfigured specific APNs is that the UE does not need to dynamically load APN information from the ANDSF for visited scenarios.

The traditional routing rules provide that filter rules can identify which APNs are restricted for IP flows that match specific IP filters. For the traditional routing rules, a filter rule can only be applied when the routing rule steers IP traffic to an existing, i.e. already established, PDN connection. Traditionally, when no APN in the filter rule is associated with an existing PDN connection, a filter rule is not applied. The traditional rules fail to cover the scenario for IARPs applying to new PDN connections.

In one embodiment, to cover the scenario for IARPs applying to new PDN connections, the IARP can be limited to existing PDN connections. Limiting the IARP to the existing PDN connections can limit the flexibility of the UE taking advantage of information available in an IARP for establishing new PDN connections. In one embodiment, the information in the IARP can be applied to new PDN connections. In another embodiment, filter rules can be applied to the IARPs based on specific applications initiated to create PDN connections with specific routing criteria. In one embodiment, an application identification (AppID) branch in an IP flow node can be used to specify the information available in the IARP. In another embodiment, the routing criteria can be based on a type of application, a class of application, and/or a PDN connection. For example, a voice application, a video application, and an instant messaging service (IMS) application can be different types of applications and can have selected filter rules as part of the IARP.

Figure 13:
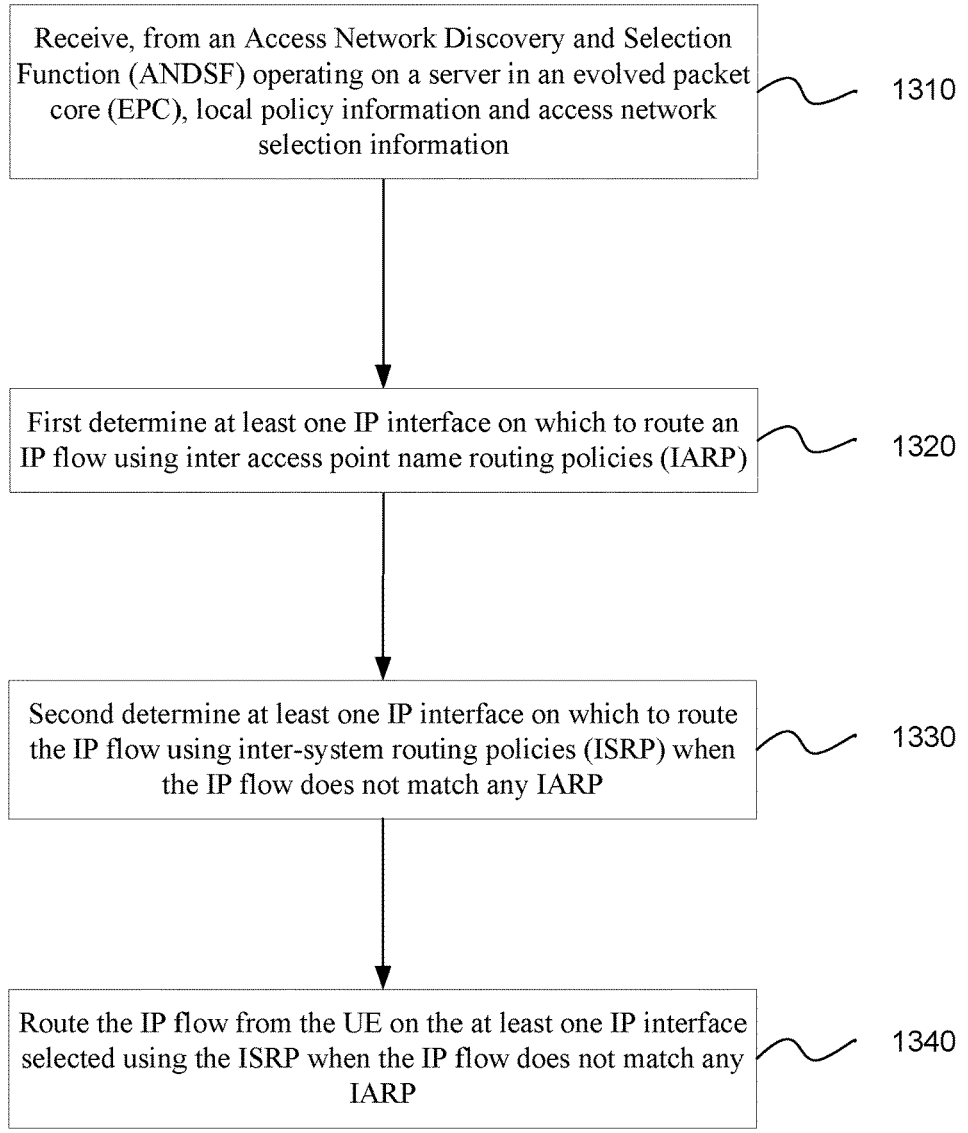
FIG. 13 depicts the functionality of computer circuitry with a UE operable to select an IP interface in a communications network in accordance with an example.

Another example provides functionality 1300 of computer circuitry of a UE operable to select an IP interface in a communications network, as shown in the flow chart in FIG. 13. The functionality can be implemented as a method or the functionality can be executed as instructions on a machine, where the instructions are included on at least one computer readable medium or one non-transitory machine readable storage medium. The computer circuitry can be configured to receive, from an ANDSF operating on a server in an EPC, local policy information and access network selection information, as in block 1310. The computer circuitry can be further configured to first determine at least one IP interface on which to route an IP flow using IARP, as in block 1320. The computer circuitry can also be configured to second determine at least one IP interface on which to route the IP flow using ISRP when the IP flow does not match any IARP, as in block 1330. The computer circuitry can also be configured to route the IP flow from the UE on the at least one IP interface selected using the ISRP when the IP flow does not match any IARP, as in block 1340.

In one embodiment, the IARP includes policies for NSWO and inter-APN rules. In another embodiment, the computer circuitry can be configured to send a request from the UE to the ANDSF for the IARP, wherein the ANDSF includes the IARP and the ISRP. In another embodiment, the computer circuitry can be configured to receive, from the ANDSF, a list of Inter-APN Routing Policies for routing IP traffic. In another embodiment, the computer circuitry can be configured to receive, from the ANDSF, a list of NSWO policies for routing IP traffic. In one embodiment, the ISRP indicates how to distribute traffic among available accesses when the UE connects to an EPC through multiple accesses. In another embodiment, the UE can include an antenna, a camera, a touch sensitive display screen, a speaker, a microphone, a graphics processor, an application processor, internal memory, or a non-volatile memory port.

Another example provides functionality 1400 of computer circuitry of a UE operable to select an IP interface in a communications network, as shown in the flow chart in FIG. 14. The functionality can be implemented as a method or the functionality can be executed as instructions on a machine, where the instructions are included on at least one computer readable medium or one non-transitory machine readable storage medium. The computer circuitry can be configured to receive, from an ANDSF operating on a server in an EPC, local policy information and access network selection information, as in block 1410. The computer circuitry can be further configured to determine at least one IP interface on which to route an IP flow using IARP prior to implementing other routing policies, as in block 1420. The computer circuitry can also be configured to route the IP flow from the UE on the at least one IP interface selected using the IARP, as in block 1430.

In one embodiment, the IARP includes policies for NSWO and inter-APN rules. In another embodiment, the computer circuitry can be configured to assign a selected value to an APN to enable one or more priorities of the NSWO to be evaluated with the inter-APN rules. In one embodiment, at least one of the other routing policies is a NSWO policy. In another embodiment, the computer circuitry can be configured to route the IP flow for a WLAN offload when the non-seamless WLAN offload is selected by the IARP. In another embodiment, the computer circuitry can be configured to route the IP flow to PDN connections corresponding to an APN when the APN is selected by the IARP. In another embodiment, the computer circuitry can be configured to select an APN or non-seamless WLAN offload to route user plane traffic matching specific IP flows.

In another embodiment, the computer circuitry can be configured to determine when an APN or NSWO is restricted from routing a specific IP flow. In another embodiment, the computer circuitry can be configured to use the IARP for an APN when the IARP steers the IP flow to an existing PDN connection. In another embodiment, the computer circuitry can be configured to use the IARP for an APN when the IARP steers the IP flow to a new PDN connection. In another embodiment, the computer circuitry can be configured to apply filter rules to selected applications used to create one or more PDN connections with selected routing criteria. In another embodiment, the computer circuitry can be configured to determine the filter rules using an AppID branch in an internet protocol flow (IPFlow) node. In another embodiment, the computer circuitry can be configured to determine the filter rules based on a type of application, a class of application, or a PDN connection.

Figure 15:
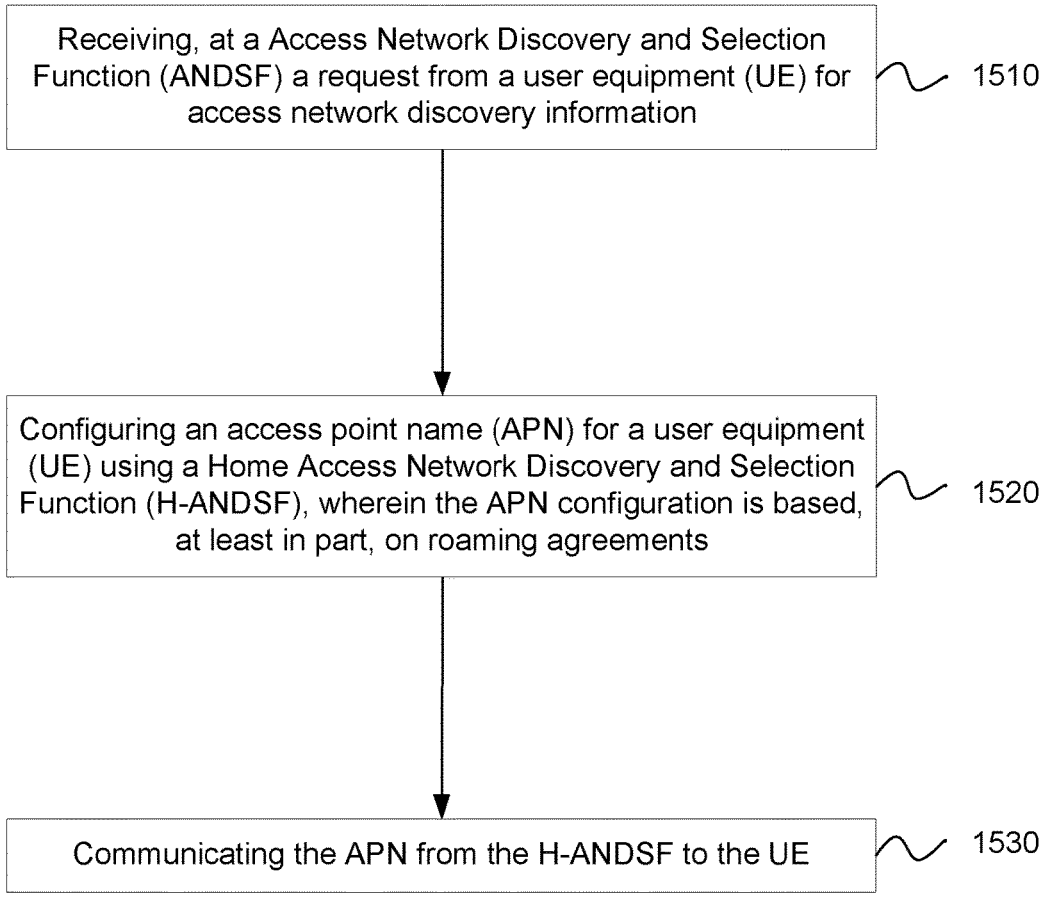
FIG. 15 illustrates a method for selecting an IP interface in a communications network in accordance with an example.

FIG. 15 uses a flow chart 1500 to illustrate a method for selecting an IP interface in a communications network. The method can comprise receiving, at an ANDSF a request from a UE for access network discovery information, as in block 1510. The method can be further comprise configuring an APN for a UE using a H-ANDSF, wherein the APN configuration is based, at least in part, on roaming agreements, as in block 1520. The method can also comprise communicating the APN from the H-ANDSF to the UE, as in block 1530. In one embodiment, the method can further comprise preconfiguring an APN for the UE using the H-ANDSF. In another embodiment, the method can further comprise using, at the UE, the preconfigured APN when the UE is connected to a preferred visited roaming partner.

Figure 16:
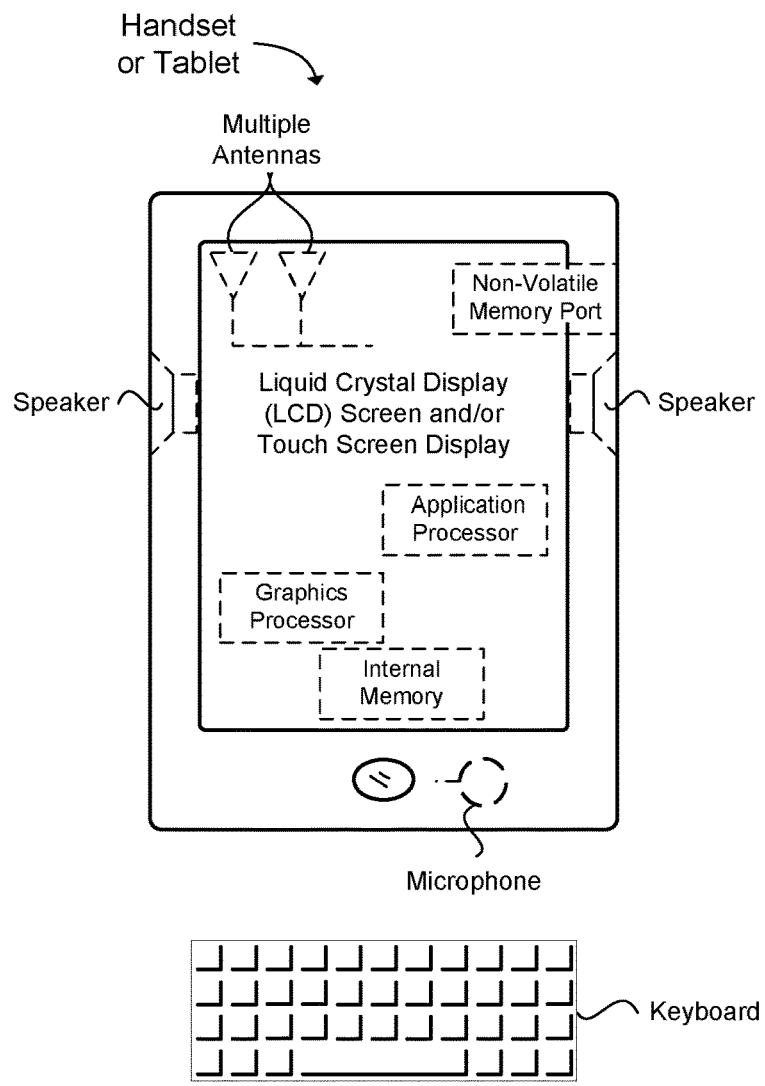
FIG. 16 illustrates a diagram of a UE in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A processor in a user equipment (UE) operable to select an internet protocol (IP) interface in a communications network, the processor having computer circuitry configured to:
    receive, from an Access Network Discovery and Selection Function (ANDSF) located in an evolved packet core (EPC), access network selection information;
    first determine at least one IP interface on which to route an IP flow using inter access point name routing policies (IARP) included in the access network selection information received from the ANDSF, wherein the IARP includes one or more policies for non-seamless wireless local area network (WLAN) offload (NSWO) and inter-access point name (APN) rules;
    second determine at least one IP interface on which to route the IP flow using inter-system routing policies (ISRP) when the IP flow does not match any IARP and based on the one or more policies for NSWO included in the IARP; and
    route the IP flow from the UE on the at least one IP interface selected using the ISRP when the IP flow does not match any IARP.

2. The processor of claim 1, further configured to send a request from the UE to the ANDSF for the IARP, wherein the ANDSF includes the IARP and the ISRP.

3. The processor of claim 1, further configured to receive, from the ANDSF, a list of Inter-APN Routing Policies for routing IP traffic.

4. The processor of claim 1, further configured to receive, from the ANDSF, a list of non-seamless wireless local area network (WLAN) offload (NSWO) policies for routing IP traffic.

5. The processor of claim 1, wherein the ISRP indicates to the UE how to distribute traffic among available accesses when the UE connects to an evolved packet core (EPC) through multiple accesses.

6. The processor of claim 1, wherein the UE includes an antenna, a camera, a touch sensitive display screen, a speaker, a microphone, a graphics processor, an application processor, internal memory, or a non-volatile memory port.

7. A user equipment (UE) operable to select an internet protocol (IP) interface in a communications network, the UE comprising:
    one or more antennas;
    a radio; and
    a processor configured to:
        receive, from an Access Network Discovery and Selection Function (ANDSF) located in an evolved packet core (EPC), local policy information and access network selection information;
        determine at least one IP interface on which to route an IP flow using inter access point name routing policies (IARP) prior to implementing one or more other routing policies, wherein the IARP includes one or more policies for non-seamless wireless local area network (WLAN) offload (NSWO) and inter-access point name (APN) rules;
        determine at least one IP interface on which to route the IP flow using inter-system routing policies (ISRP)

when the IP flow does not match any IARP and based on the one or more policies for NSWO included in the TARP; and route the IP flow from the UE on the at least one IP interface selected using the ISRP.

8. The UE of claim 7, further configured to assign a selected value to an APN to enable one or more priorities of the NSWO to be evaluated with the inter-APN rules.

9. The UE of claim 7, further configured to route the IP flow for a non-seamless wireless local area network (WLAN) offload when the non-seamless WLAN offload is selected by the IARP.

10. The UE of claim 7, further configured to route the IP flow to packet data network (PDN) connections corresponding to an access point name (APN) when the APN is selected by the TARP.

11. The UE of claim 7, further configured to select an access point name (APN) or non-seamless WLAN offload to route user plane traffic matching specific IP flows.

12. The UE of claim 7, further configured to determine when an access point name (APN) or non-seamless wireless local area network (WLAN) offload is restricted from routing a specific IP flow.

13. The UE of claim 7, further configured to use the IARP for an access point name (APN) when the TARP steers the IP flow to an existing packet data networks (PDN) connection.

14. The UE of claim 7, further configured to use the IARP for an access point name (APN) when the TARP steers the IP flow to a new packet data networks (PDN) connection.

15. The UE of claim 14, further configured to apply filter rules to selected applications used to create one or more PDN connections with selected routing criteria.

16. The UE of claim 15, further configured to determine the filter rules using an application identify (AppID) branch in an internet protocol flow (IPFlow) node.

17. The UE of claim 15, further configured to determine the filter rules based on a type of application, a class of application, or a PDN connection.

18. At least one non-transitory machine readable storage medium having instructions embodied thereon to select an internet protocol (IP) interface in a communications network, the instructions when executed by one or more processors at a UE perform the following:

receive, from an Access Network Discovery and Selection Function (ANDSF) located in an evolved packet core (EPC), access network selection information;

first determine at least one IP interface on which to route an IP flow using inter access point name routing policies (TARP) included in the access network selection information received from the ANDSF, wherein the IARP includes one or more policies for non-seamless wireless local area network (WLAN) offload (NSWO) and inter-access point name (APN) rules;

second determine at least one IP interface on which to route the IP flow using inter-system routing policies (ISRP) when the IP flow does not match any IARP and based on the one or more policies for NSWO included in the IARP; and route the IP flow from the UE on the at least one IP interface selected using the ISRP when the IP flow does not match any IARP.

19. The at least one non-transitory machine readable storage medium of claim 18, further comprising instructions that when executed perform:

send a request from the UE to the ANDSF for the IARP, wherein the ANDSF includes the TARP and the ISRP.

20. The at least one non-transitory machine readable storage medium of claim 18, further comprising instructions that when executed perform:

receive, from the ANDSF, a list of Inter-APN Routing Policies for routing IP traffic.

21. The at least one non-transitory machine readable storage medium of claim 18, further comprising instructions that when executed perform:

receive, from the ANDSF, a list of non-seamless wireless local area network (WLAN) offload (NSWO) policies for routing IP traffic.

22. The at least one non-transitory machine readable storage medium of claim 18, wherein the ISRP indicates to the UE how to distribute traffic among available accesses when the UE connects to an evolved packet core (EPC) through multiple accesses.

* * * * *